(12) United States Patent
Lin et al.

(10) Patent No.: US 11,988,934 B2
(45) Date of Patent: May 21, 2024

(54) ELECTRONIC DEVICE

(71) Applicant: InnoLux Corporation, Miao-Li County (TW)

(72) Inventors: Bi-Ly Lin, Miao-Li County (TW); Rong-Jyun Lin, Miao-Li County (TW); I-Wen Yang, Miao-Li County (TW); Chih-Chung Hsu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/746,750

(22) Filed: May 17, 2022

(65) Prior Publication Data

US 2022/0390786 A1  Dec. 8, 2022

(30) Foreign Application Priority Data

Jun. 8, 2021 (CN) .......................... 202110639944.3

(51) Int. Cl.
*G02F 1/137* (2006.01)
*G02F 1/1335* (2006.01)

(52) U.S. Cl.
CPC .... *G02F 1/13718* (2013.01); *G02F 1/133531* (2021.01); *G02F 1/13725* (2013.01)

(58) Field of Classification Search
CPC ........... G02F 1/13718; G02F 1/133531; G02F 1/13725; G02F 1/134372; G02F 1/134363; G02F 1/1347
USPC ........................................................ 349/137
See application file for complete search history.

(56) References Cited

U.S. PATENT DOCUMENTS

| | | | |
|---|---|---|---|
| 2006/0066803 A1 | 3/2006 | Aylward et al. | |
| 2012/0154712 A1* | 6/2012 | Yu | G02F 1/133606 349/64 |
| 2013/0201436 A1* | 8/2013 | Choi | G02F 1/133526 349/193 |
| 2013/0312341 A1* | 11/2013 | Gy | B32B 37/142 156/101 |
| 2018/0299726 A1* | 10/2018 | Oka | G02F 1/133528 |
| 2018/0307111 A1* | 10/2018 | Le Houx | B32B 17/10201 |
| 2019/0107752 A1* | 4/2019 | Yoon | G02F 1/1343 |
| 2022/0235918 A1* | 7/2022 | Koito | F21V 14/003 |
| 2023/0148148 A1* | 5/2023 | Butler | E06B 9/24 349/56 |

FOREIGN PATENT DOCUMENTS

| | | |
|---|---|---|
| CN | 112602011 A | 4/2021 |
| TW | 201821878 A | 6/2018 |
| TW | 201901271 A | 1/2019 |

* cited by examiner

*Primary Examiner* — Dung T Nguyen
*Assistant Examiner* — David Y Chung
(74) *Attorney, Agent, or Firm* — MUNCY, GEISSLER, OLDS & LOWE, P.C.

(57) ABSTRACT

An electronic device includes: a first light modulation assembly, including: a first substrate; a second substrate opposite to the first substrate; a first conductive layer disposed on the first substrate; a second conductive layer disposed on the second substrate; a first insulating layer disposed on the first substrate; and a first light modulation layer disposed between the first conductive layer and the second conductive layer.

17 Claims, 14 Drawing Sheets

ELECTRONIC DEVICE

CROSS REFERENCE TO RELATED APPLICATION

This application claims the benefits of the Chinese Patent Application Serial Number 202110639944.3, filed on Jun. 8, 2021, the subject matter of which is incorporated herein by reference.

BACKGROUND

1. Field

The present disclosure relates to an electronic device. More specifically, the present disclosure relates to an electronic device with a light modulation assembly having special designs.

2. Description of Related Art

In recent years, with the development of science and technology and the increasing awareness of environmental protection, various energy-saving and carbon-reducing products have been produced, such as smart windows. Smart windows refer to a device that the light transmittance thereof can be controlled and changed, so that the glass plate of the window can be in a light-transmitting state, a dark state, a fog state, etc. Thus, the effect of the light transmission and/or heat insulation can be achieved. In addition, since the smart windows can also have functions such as shielding and/or privacy, they can also be used in meeting rooms, indoor compartment design, etc., making the use of the space more flexible.

However, at present, there are still many shortcomings in the smart windows, such as the color halo phenomenon in the light-transmitting state, or the problem that the dark state is not dark enough.

Hence, there is desirable to provide a novel electronic device to improve the quality thereof.

SUMMARY

In view of this, the present disclosure provides an electronic device, wherein a light modulation assembly is designed to have specific structures to improve the quality of the electronic device.

To achieve the aforesaid object, the present disclosure provides an electronic device, which comprises: a first light modulation assembly, comprising: a first substrate; a second substrate opposite to the first substrate; a first conductive layer disposed on the first substrate; a second conductive layer disposed on the second substrate; a first insulating layer disposed on the first substrate; and a first light modulation layer disposed between the first conductive layer and the second conductive layer.

The present disclosure further provides an electronic device, which comprises: a first light modulation assembly, comprising: a first substrate; a second substrate opposite to the first substrate; a polarizer disposed between the first substrate and the second substrate; a first light modulation layer disposed between the first substrate and the polarizer; and a second light modulation layer disposed between the second substrate and the polarizer.

Other novel features of the disclosure will become more apparent from the following detailed description when taken in conjunction with the accompanying drawings.

DETAILED DESCRIPTION OF EMBODIMENT

The following is specific embodiments to illustrate the implementation of the present disclosure. Those who are familiar with this technique can easily understand the other advantages and effects of the present disclosure from the content disclosed in the present specification. The present disclosure can also be implemented or applied by other different specific embodiments, and various details in the present specification can also be modified and changed according to different viewpoints and applications without departing from the spirit of the present disclosure.

It should be noted that, in the present specification, when a component is described to have an element, it means that the component may have one or more of the elements, and it does not mean that the component has only one of the element, except otherwise specified.

Furthermore, the ordinals recited in the specification and the claims such as "first", "second", "third" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element.

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation. In addition, the present disclosure may be combined with other known structures to form other embodiments.

Figure 1A:
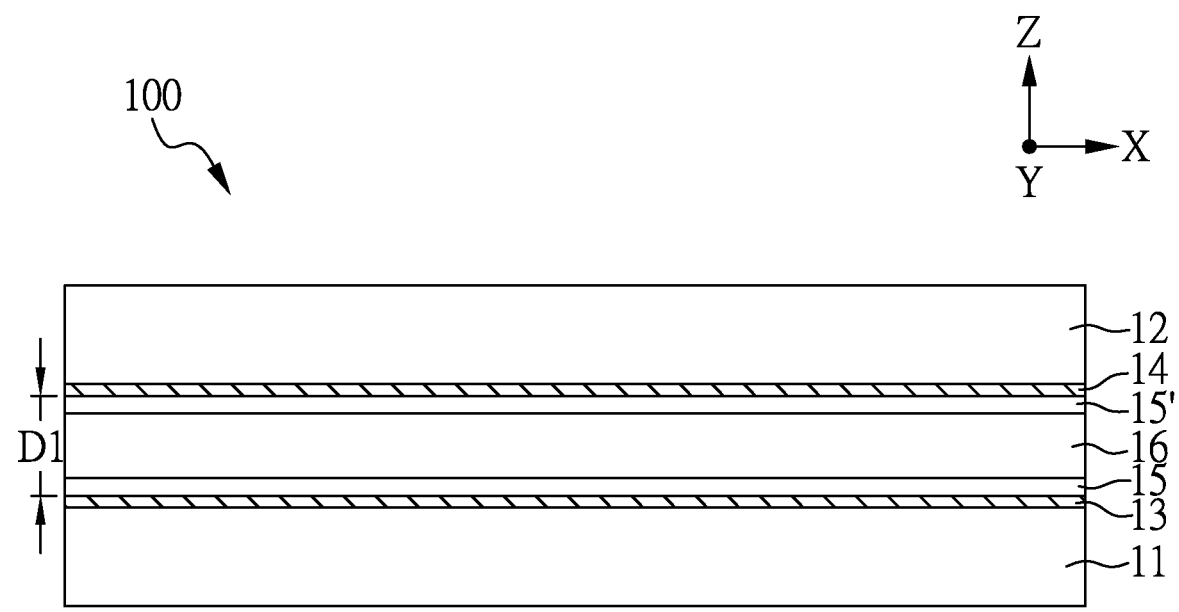
FIG. 1A to FIG. 1C are schematic views of first light modulation assemblies according to some embodiments of the present disclosure.
Figure 1B:
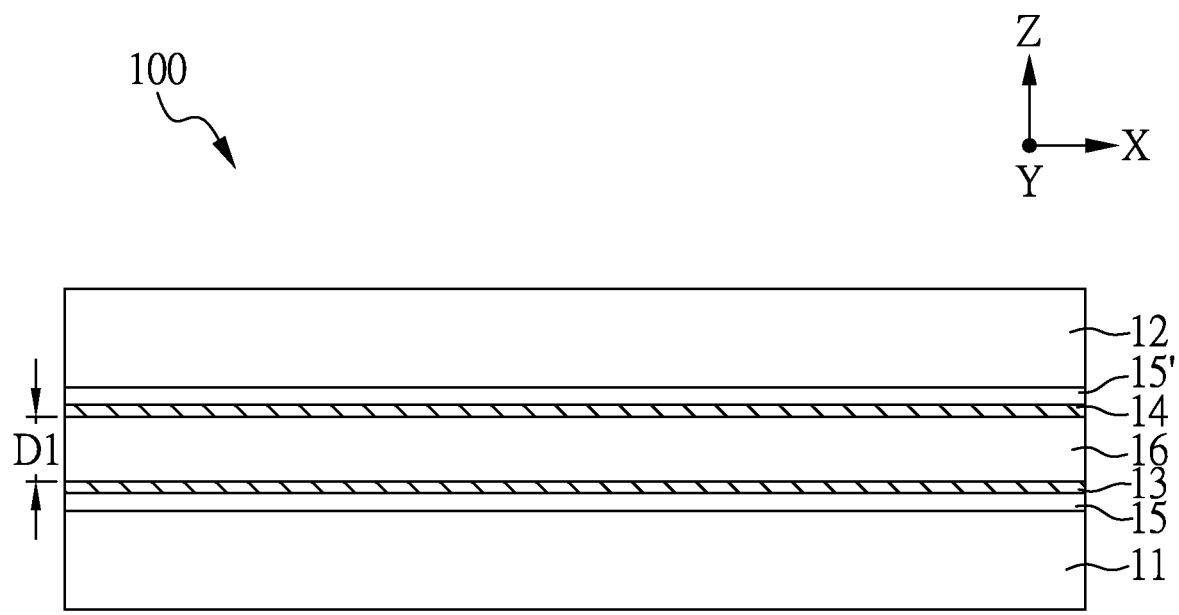
Figure 1C:
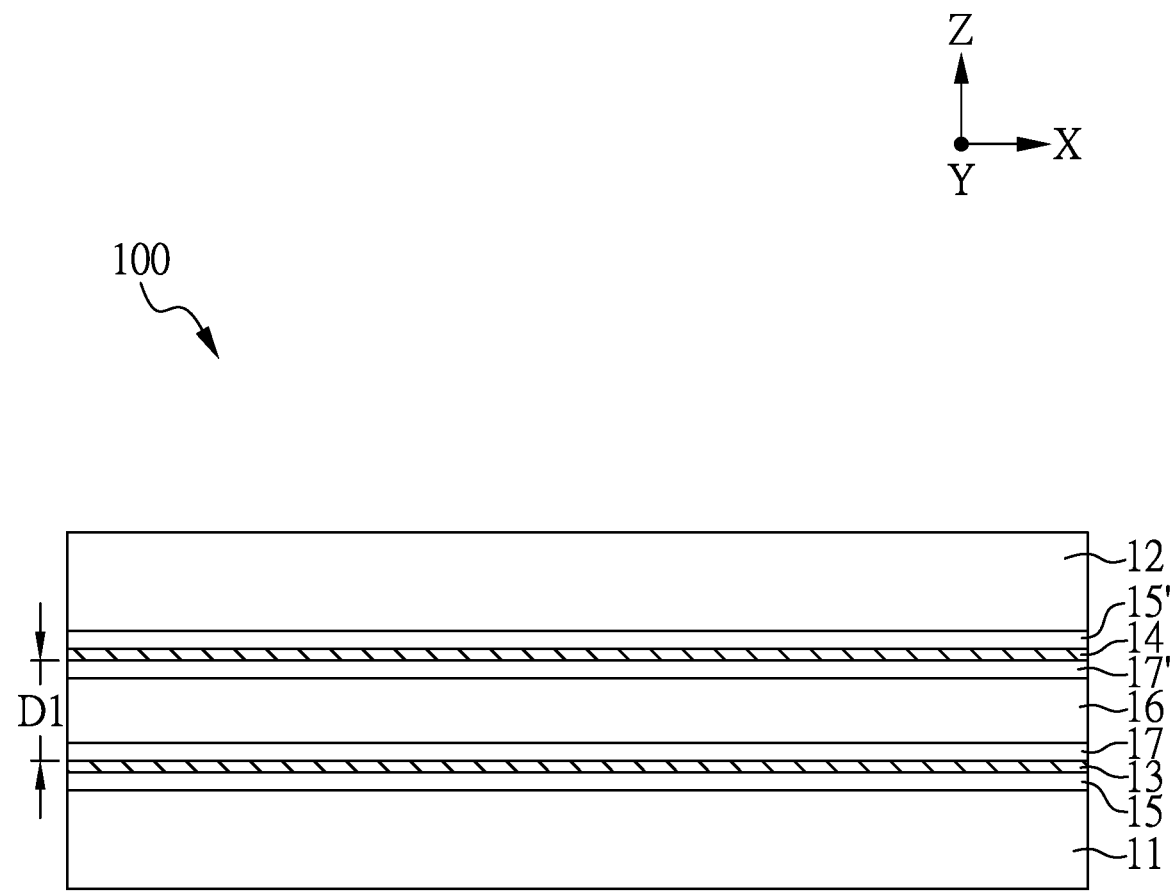

FIG. 1A to FIG. 1C are schematic views of first light modulation assemblies according to some embodiments of the present disclosure. The first light modulation assembly 100 of the present disclosure comprises: a first substrate 11; a second substrate 12 opposite to the first substrate 11; a first conductive layer 13 disposed on the first substrate 11; a second conductive layer 14 disposed on the second substrate 12; a first insulating layer 15 disposed on the first substrate 11; and a first light modulation layer 16 disposed between the first conductive layer 13 and the second conductive layer 14. In the present disclosure, the first insulating layer 15 is disposed on the first substrate 11 to achieve the effect of improving the color halo phenomenon or protecting the conductive layer.

The first light modulation assemblies 100 of FIG. 1A to FIG. 1C are substantially similar, except for the following differences. As shown in FIG. 1A, in one embodiment of the present disclosure, the first conductive layer 13 is disposed between the first substrate 11 and the first insulating layer 15. Thus, the first insulating layer 15 may protect the first conductive layer 13 and avoid the deterioration of the first conductive layer 13 caused by scratches or the like. As shown in FIG. 1B, in one embodiment of the present disclosure, the first insulating layer 15 is disposed between the first substrate 11 and the first conductive layer 13 to improve the color halo phenomenon of the electronic device. As shown in FIG. 1C, in one embodiment of the present disclosure, the first light modulation assembly 100 may further comprise a second insulating layer 17 disposed on the first substrate 11, and the first conductive layer 13 is disposed between the first insulating layer 15 and the second insulating layer 17. Thus, the first insulating layer 15 or the second insulating layer 17 may achieve the effect of improving the color halo phenomenon or protecting the first conductive layer 13.

Furthermore, as shown in FIG. 1A to FIG. 1C, in some embodiments of the present disclosure, another first insulating layer 15' and/or another second insulating layer 17' may be disposed on the second substrate 12 to further improve the color halo phenomenon or protect the second conductive layer 14.

In addition, even not shown in the figure, in another embodiment of the present disclosure, the first light modulation assembly 100 may selectively further comprise an alignment layer disposed between the first light modulation layer 16 and the first conductive layer 13, the first insulating layer 15 or the second insulating layer 17. More specifically, the alignment layer may directly contact the first light modulation layer 16 to achieve the purpose of alignment. In addition, the first light modulation assembly 100 may selectively further comprise another alignment layer disposed between the first light modulation layer 16 and the second conductive layer 14, the first insulating layer 15' or the second insulating layer 17'. More specifically, the alignment layer may directly contact the first light modulation layer 16 to achieve the purpose of alignment.

The first light modulation assembly 100 of the present disclosure may be connected to an external system (not shown in the figure), which may provide voltage or signal to the first conductive layer 13 and the second conductive layer 14, to form an electronic device of the present disclosure. Through applying the voltage to the first conductive layer 13 and the second conductive layer 14 to control the first light modulation layer 16, the electronic device of the present disclosure can have the functions of light transmittance, heat insulation, shielding and/or privacy.

Herein, the first substrate 11 and the second substrate 12 may be prepared by the same or different materials. The materials of the first substrate 11 and the second substrate 12 may comprise glass, quartz, sapphire, ceramic, polycarbonate (PC), polyimide (PI), polyethylene terephthalate (PET), polymethylmethacrylate (PMMA), other suitable substrate material or a combination thereof; but the present disclosure is not limited thereto.

The materials of the first conductive layer 13 and the second conductive layer 14 may be the same or different and may comprise, for example, a metal, a metal oxide, an alloy thereof or a combination thereof For example, the materials of the first conductive layer 13 and the second conductive layer 14 may respectively comprise gold (Au), silver (Ag), copper (Cu), aluminum (Al), platinum (Pt), indium zinc oxide (IZO), indium tin oxide (ITO), indium tin zinc oxide (ITZO), indium gallium zinc oxide (IGZO), or alumina zinc oxide (AZO); but the present disclosure is not limited thereto. The thicknesses of the first conductive layer 13 and the second conductive layer 14 may respectively be in a range from 150 Å to 2000 Å. In addition, the distance D1 between the first conductive layer 13 and the second conductive layer 14 may be in a range from 3 μm to 25 μm. When the distance between the first conductive layer 13 and the second conductive layer 14 is too small, the short circuit may be easily occurred. When the distance between the first conductive layer 13 and the second conductive layer 14 is too large, it is not easy to control the first light modulation layer 16.

The materials of the first insulating layer 15, another first insulating layer 15', the second insulating layer 17 and another second insulating layer 17' may be the same or different and may respectively be, for example, silicon oxynitride ($SiO_xN_y$), silicon oxide, silicon nitride, nitrogen-doped silicon carbide (SiNC) or a combination thereof; but the present disclosure is not limited thereto. The thicknesses of the first insulating layer 15, another first insulating layer 15', the second insulating layer 17 and another second insulating layer 17' may respectively be in a range from 300 Å to 1000 Å. The material of the alignment layer may be polyimide (PI), polymethylmethacrylate (PMMA), silicon oxide, silicon nitride or a combination thereof; but the present disclosure is not limited thereto.

The material of the first light modulation layer 16 may comprise, for example, guest host type liquid crystals (GHLCs), dye-doped liquid crystals, twisted nematic liquid crystals (TN LCs), super twisted nematic liquid crystals (STN LCs), polymer dispersed liquid crystals (PDLCs), polymer network liquid crystals (PNLCs), cholesteric texture liquid crystals, polymer-stabilized cholesteric texture liquid crystals (PSCT LCs), suspended particle materials (SPDs), electrochromic materials or a combination thereof; but the present disclosure is not limited thereto.

Figure 2:
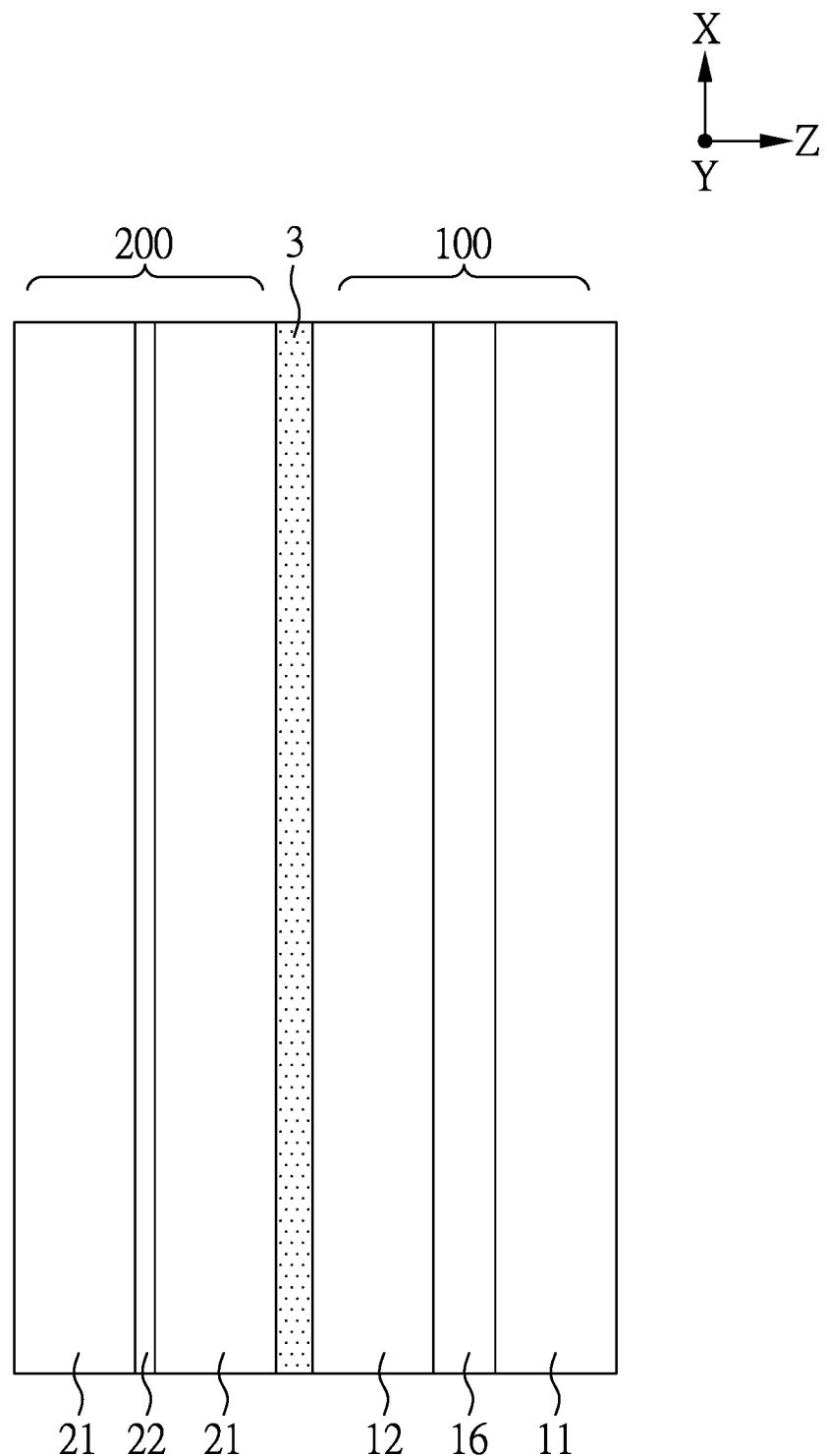
FIG. 2 is a schematic view of an electronic device according to some embodiments of the present disclosure.

FIG. 2 is a schematic view of an electronic device according to some embodiments of the present disclosure. For the convenience of description, parts of the structure of the first light modulation assembly 100, for example the first conductive layer 13, the second conductive layer 14 and the first insulating layer 15 are not shown in the FIG. 2.

As shown in FIG. 2, the electronic device of some embodiments of the present disclosure may further comprise a temperature adjusting assembly 200 opposite to the first light modulation assembly 100. The temperature adjusting assembly 200 comprises two substrates 21 and a vacuum layer 22, and the vacuum layer 22 is disposed between the two substrates 21. Since heat conduction relies on the medium to transfer heat, heat conduction does not occur in a vacuum environment. Thus, in the electronic device of the present disclosure, by disposing the temperature adjusting assembly 200 including the vacuum layer 22, it is possible to avoid temperature loss and achieve a constant temperature effect. In some embodiments, the temperature adjusting assembly 200 may include a heating metal layer or heating coils (not shown in the figure) disposed between the two substrates 21. In some embodiments, the temperature adjusting assembly 200 may be designed to be close to the indoor side, which can facilitate temperature control.

In the present disclosure, the first light modulation assembly 100 shown in any one of FIG. 1A to FIG. 1C may be used, and the first light modulation assembly 100 and the temperature adjusting assembly 200 may be fixed through an adhesive layer 3. In some embodiments, the temperature adjusting assembly 200 may comprise a heating metal layer or heating coils (not shown in the figure) disposed between the two substrates 21. In some embodiments, the temperature adjusting assembly 200 may be designed to be close to the indoor side, which can facilitate temperature control. However, the present disclosure is not limited thereto. In some embodiment, a plurality of temperature adjusting assemblies 200 may be used, and these temperature adjusting assemblies 200 may be respectively disposed at two sides of the first light modulation assembly 100 to improve the constant temperature effect; but the present disclosure is not limited thereto.

The materials of the substrates 21 may be similar to that of the first substrate 11 or the second substrate 12, and are not described again. In addition, the substrates 21 may be prepared by the same or different material of the first substrate 11 and/or the second substrate 12. The adhesive layer 3 may be prepared by a transparent adhesive material and may include, for example, polyvinyl butyral (PVB), ethylene vinyl acetate (EVA), optical clear adhesive (OCA), optical clear resin (OCR), other suitable materials of a combination thereof; but the present disclosure is not limited thereto.

Figure 3:
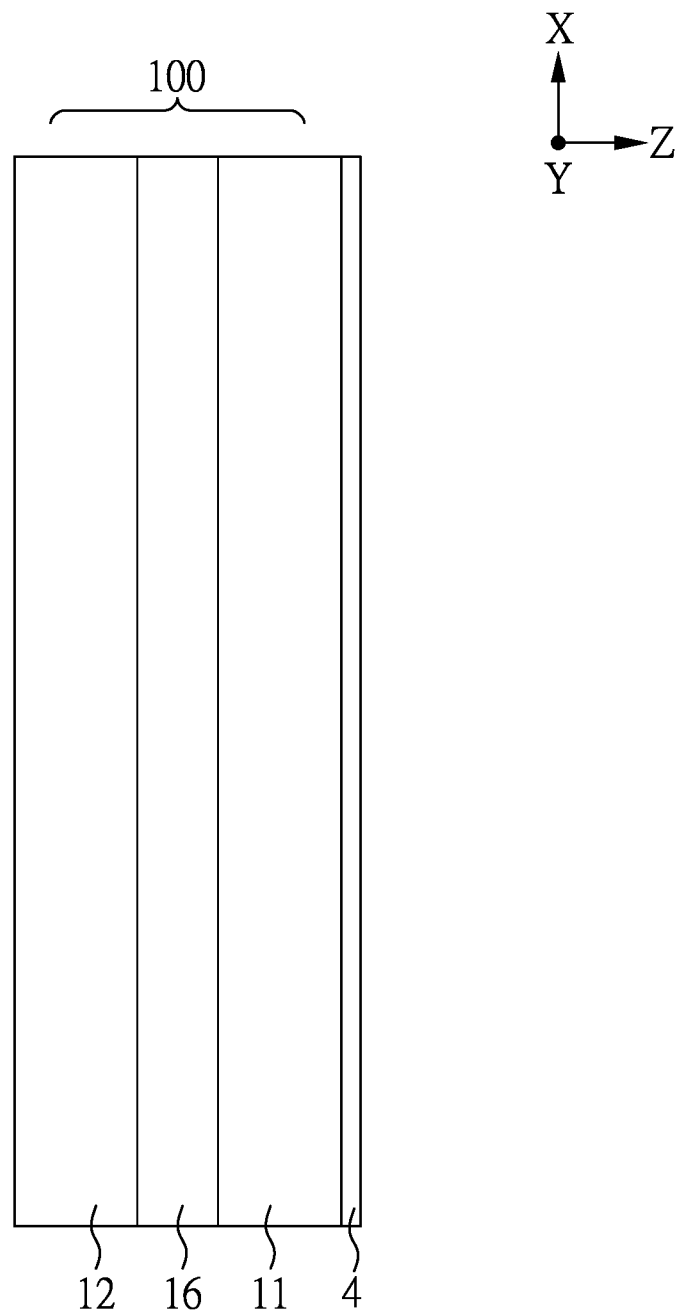
FIG. 3 is a schematic view of an electronic device according to some embodiments of the present disclosure.

FIG. 3 is a schematic view of an electronic device according to some embodiments of the present disclosure. For the convenience of description, parts of the structure of the first light modulation assembly 100, for example the first conductive layer 13, the second conductive layer 14 and the first insulating layer 15 are not shown in the FIG. 3.

As shown in FIG. 3, the electronic device of some embodiments of the present disclosure may further comprise a polarizer 4 opposite to the first light modulation assembly 100. When the polarizer 4 is used with the first light modulation assembly 100, the contract ratio of the electronic device of the present disclosure may be increased, and the dark state effect of the electronic device may be improved.

As shown in FIG. 3, in the present disclosure, the first light modulation assembly 100 shown in any one of FIG. 1A to FIG. 1C may be used. In FIG. 3, the polarizer 4 is disposed adjacent to the first substrate 11, but the present disclosure is not limited thereto. In some embodiment, the polarizer 4 may be disposed adjacent to the second substrate 12. In some embodiments, a plurality of polarizers 4 may be used, and these polarizers 4 may be disposed adjacent to the first substrate 11 or the second substrate 12 or disposed at two sides of the first light modulation assembly 100. However, the present disclosure is not limited thereto.

Figure 4:
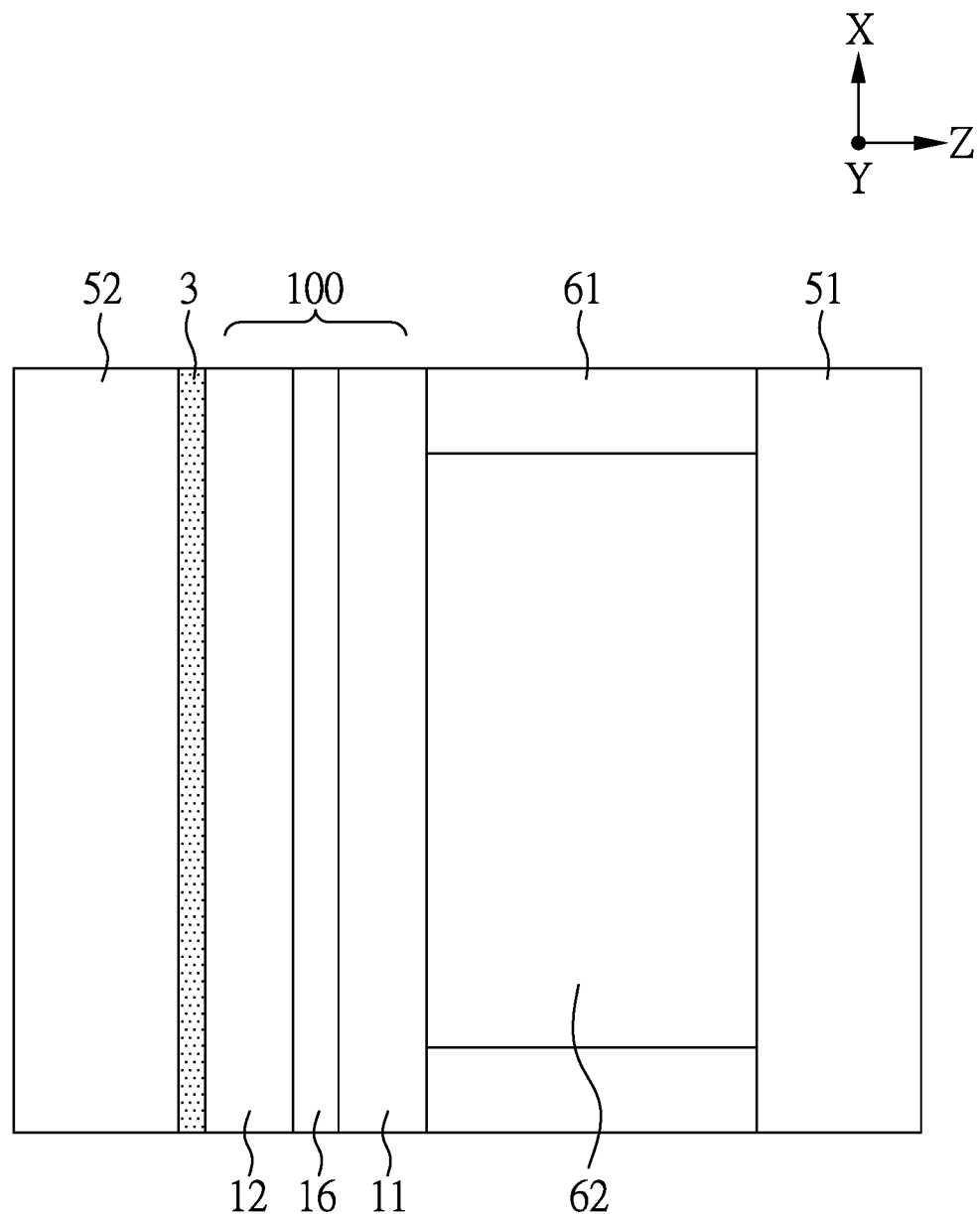
FIG. 4 is a schematic view of an electronic device according to some embodiments of the present disclosure.

FIG. 4 is a schematic view of an electronic device according to some embodiments of the present disclosure. For the convenience of description, parts of the structure of the first light modulation assembly 100, for example the first conductive layer 13, the second conductive layer 14 and the first insulating layer 15 are not shown in the FIG. 4.

As shown in FIG. 4, the electronic device of some embodiments of the present disclosure may further comprise a first support layer 51 and a second support layer 52, wherein the first light modulation assembly 100 is disposed between the first support layer 51 and the second support layer 52. In the present disclosure, the materials of the first support layer 51 and the second support layer 52 may respectively include soda lime glass or no-alkali glass to improve the reliability of the electronic device; but the present disclosure is not limited thereto.

In the present disclosure, the first light modulation assembly 100 shown in any one of FIG. 1A to FIG. 1C may be used, and the first light modulation assembly 100 and the first support layer 51 and/or the second support layer 52 may be fixed through an adhesive layer 3. In the present disclosure, the first light modulation assembly 100 and the first support layer 51 may be assembled through a sealing unit 61, wherein the sealing unit 61 may be a sealant or a metal piece; but the present disclosure is not limited thereto. In the present disclosure, as shown in FIG. 4, the electronic device may further comprise an inert gas layer 62 disposed between the first light modulation assembly 100 and the first support layer 51. More specifically, the sealed space formed by the first light modulation assembly 100, the first support layer 51 and the sealing unit 61 may be filled with the inert gas to form the inert gas layer 62 to achieve the effect of constant temperature or soundproofing. The inert gas may include helium, neon, argon or a combination thereof; but the present disclosure is not limited thereto.

Figure 5:
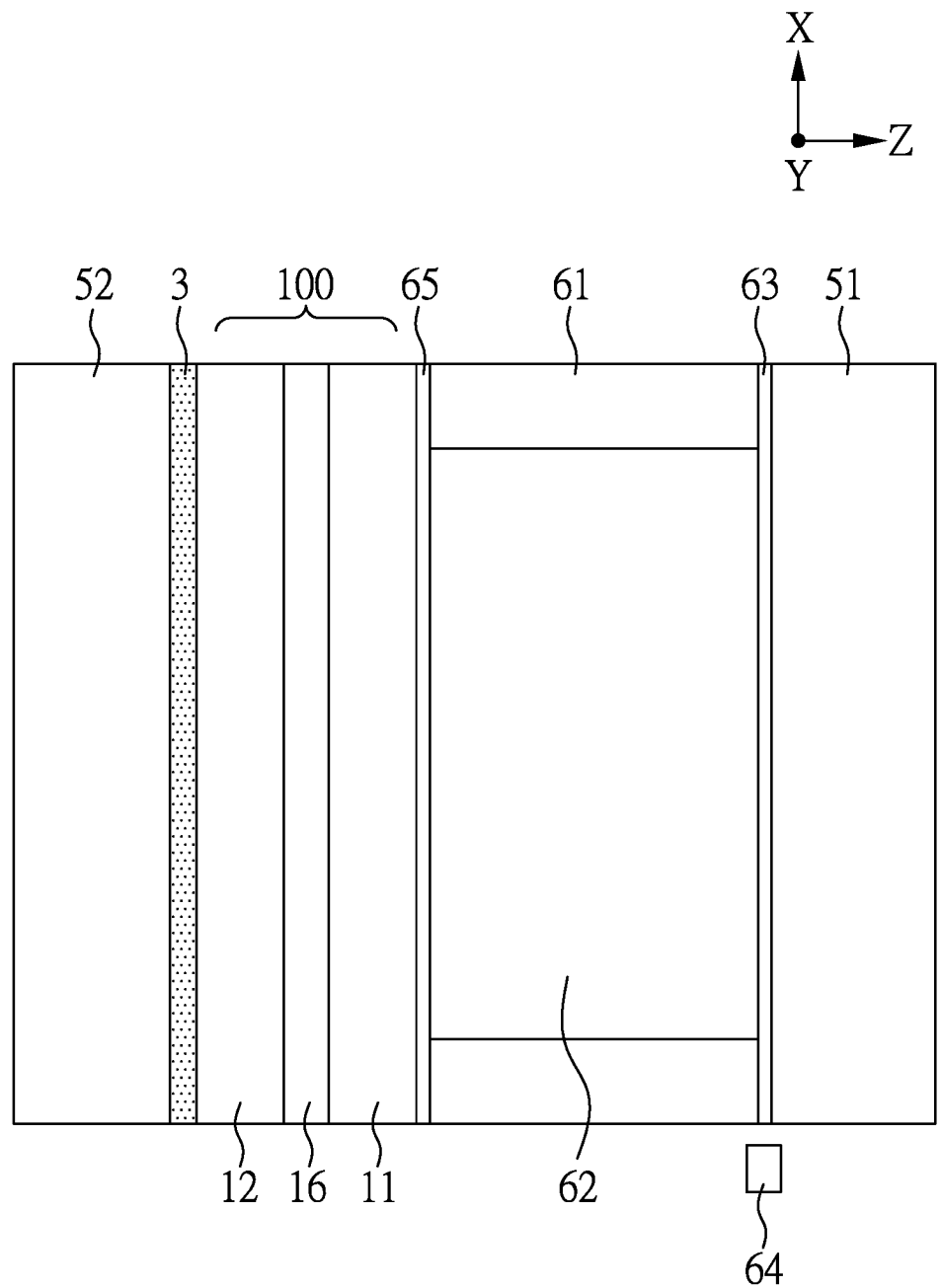
FIG. 5 is a schematic view of an electronic device according to some embodiments of the present disclosure.

As shown in FIG. 5, the electronic device of the present disclosure may further comprise: a light guide plate 63 disposed on the first support layer 51; and a light source 64 disposed on a light incident surface of the light guide plate 63. Thus, the electronic device of the present disclosure may form a color panel, which may be applied to advertisement, decoration, etc. The types of the light source 64 is not particularly limited and may be any suitable light sources such as light emitting diodes (LEDs) or glass tubes; but the present disclosure is not limited thereto. When the light source 64 is a glass tube, the inner wall of the glass tube may be coated with color fluorescent powders, and the glass tube can be filled with inert gas to provide a color light source. In addition, as shown in FIG. 5, the light source 64 is a side light source. In some embodiments, the light source 64 may be a direct light source. More specifically, the light source 64 may be disposed on the first support layer 51 and between the first support layer 51 and the light guide plate 63.

In some embodiments, the electronic device may further comprise a reflective layer (not shown in the figure) disposed on the first support layer 51 and between the first support layer 51 and the light guide plate 63, to improve the utilization of the light source 64. In some embodiments, the electronic device may further comprise an anti-reflection layer 65 disposed on the first light modulation assembly 100. More specifically, the anti-reflection layer 65 is disposed between the first substrate 11 of the first light modulation assembly 100 and the light guide plate 63 to reduce the influence of ambient light on the electronic device and improve the display quality. In the present disclosure, the material of the reflective layer may include a metal, a metal oxide (such as zinc oxide or titanium oxide) or a combination thereof; but the present disclosure is not limited thereto. The material of the anti-reflection layer 65 may include magnesium fluoride ($MgF_2$), silicon oxide, fluorinated polymers, other suitable materials or a combination thereof; but the present disclosure is not limited thereto.

Figure 6:
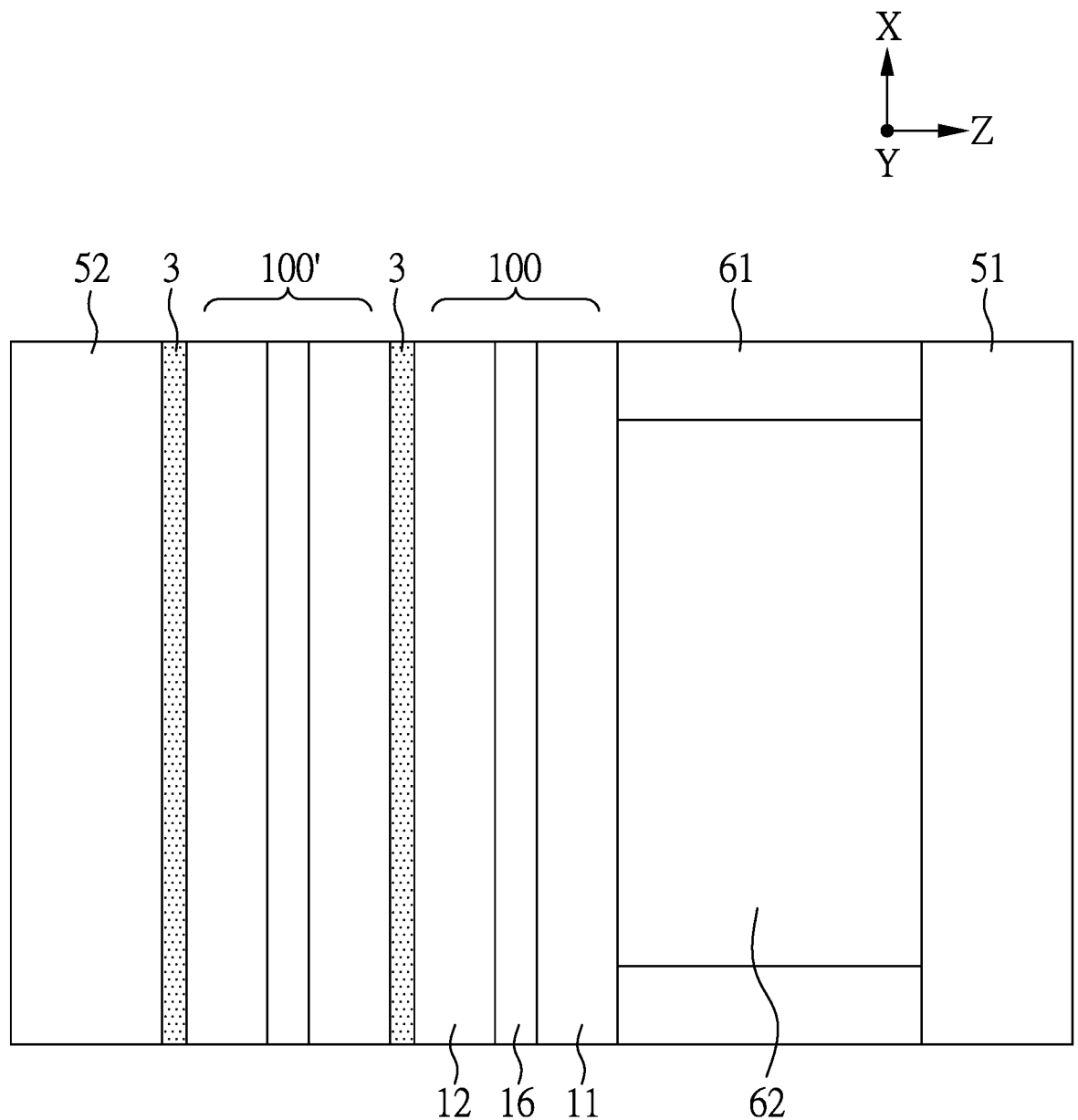
FIG. 6 is a schematic view of an electronic device according to some embodiments of the present disclosure.

As shown in FIG. 6, the electronic device of the present disclosure may further comprise a second light modulation assembly 100' opposite to the first light modulation assembly 100. More specifically, the second light modulation assembly 100' is disposed between the first light modulation assembly 100 and the second support layer 52. Herein, the second light modulation assembly 100' is similar to the first light modulation assembly 100, and the detail structure of the second light modulation assembly 100' may be referred to those shown in FIG. 1A to FIG. 1C and is not described again. By designing the second light modulation assembly 100' with the second light modulation layer, the second light modulation assembly 100' may function as a polarizer to increase the contract ratio of the electronic device and improve the dark state effect of the electronic device.

In the present disclosure, the first light modulation assembly 100 shown in any one of FIG. 1A to FIG. 1C may be used as the first light modulation assembly 100 and the second light modulation assembly 100', and the detail structures of the first light modulation assembly 100 and the second light modulation assembly 100' may be the same or different. In addition, the first light modulation assembly 100 and the second light modulation assembly 100' may be fixed through an adhesive layer 3.

Figure 7:
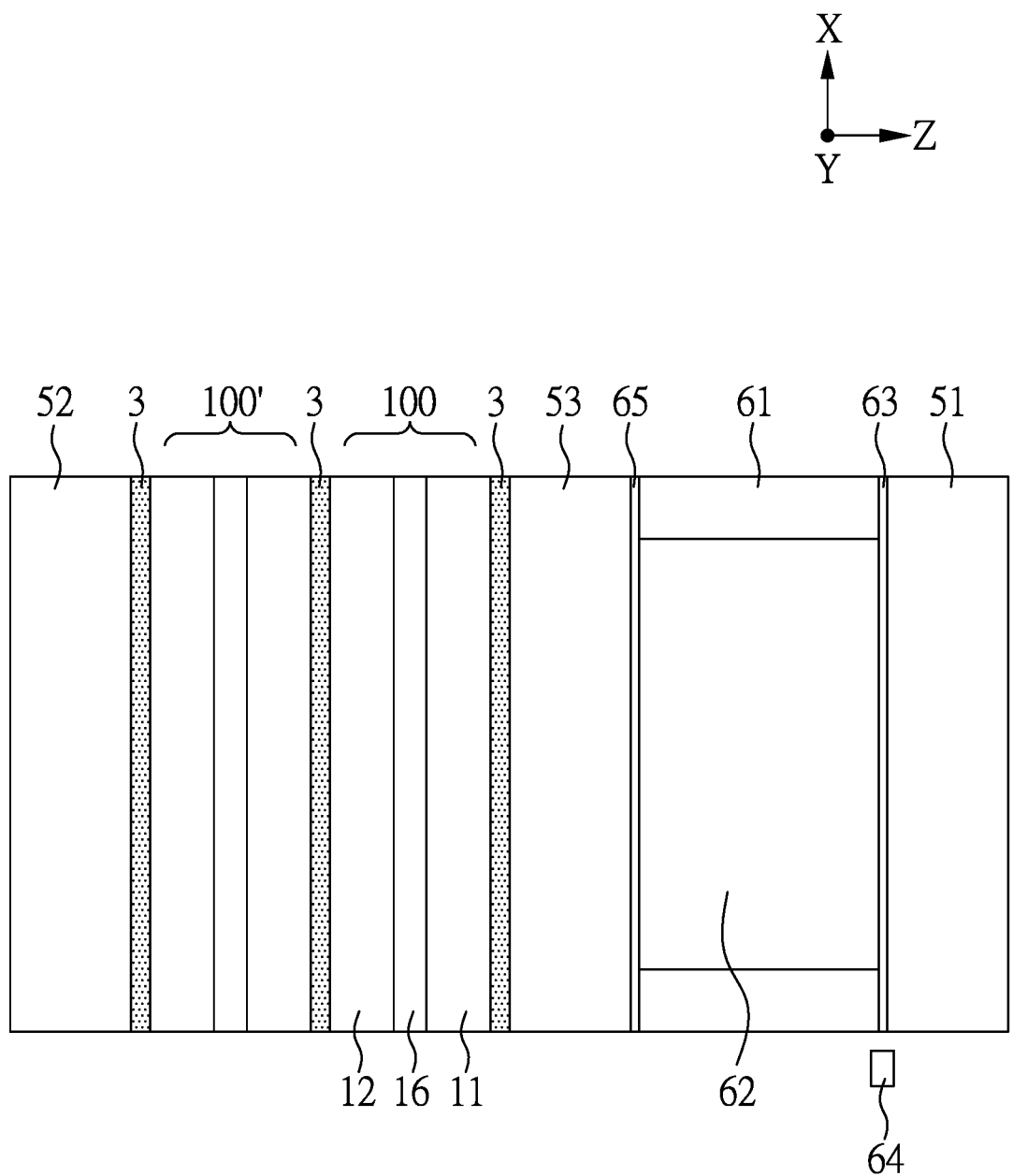
FIG. 7 is a schematic view of an electronic device according to some embodiments of the present disclosure.

As shown in FIG. 7, the electronic device of the present disclosure may further comprise a second light modulation assembly 100' opposite to the first light modulation assembly 100. More specifically, the second light modulation assembly 100' is disposed between the first light modulation assembly 100 and the second support layer 52. Herein, the second light modulation assembly 100' is similar to the first light modulation assembly 100, and the detail structure of the second light modulation assembly 100' may be referred to those shown in FIG. 1A to FIG. 1C and is not described again.

In the present disclosure, the first light modulation assembly 100 shown in any one of FIG. 1A to FIG. 1C may be used as the first light modulation assembly 100 and the second light modulation assembly 100', and the detail structures of the first light modulation assembly 100 and the second light modulation assembly 100' may be the same or different. In addition, the first light modulation assembly 100 and the second light modulation assembly 100' may be fixed through an adhesive layer 3.

As shown in FIG. 7, the electronic device of the present disclosure may further comprise a third support layer 53 opposite to the first support layer 51. More specifically, the third support layer 53 is disposed between the first support layer 51 and the first light modulation assembly 100. The third support layer 53 and the first support layer 51 may be assembled through a sealing unit 61. The third support layer 53 and the first light modulation assembly 100 may be fixed through an adhesive layer 3. In addition, the sealed space formed by the third support layer 53, the first support layer 51 and the sealing unit 61 may be filled with the inert gas to form the inert gas layer 62 to achieve the effect of constant temperature or soundproofing.

Figure 8A:
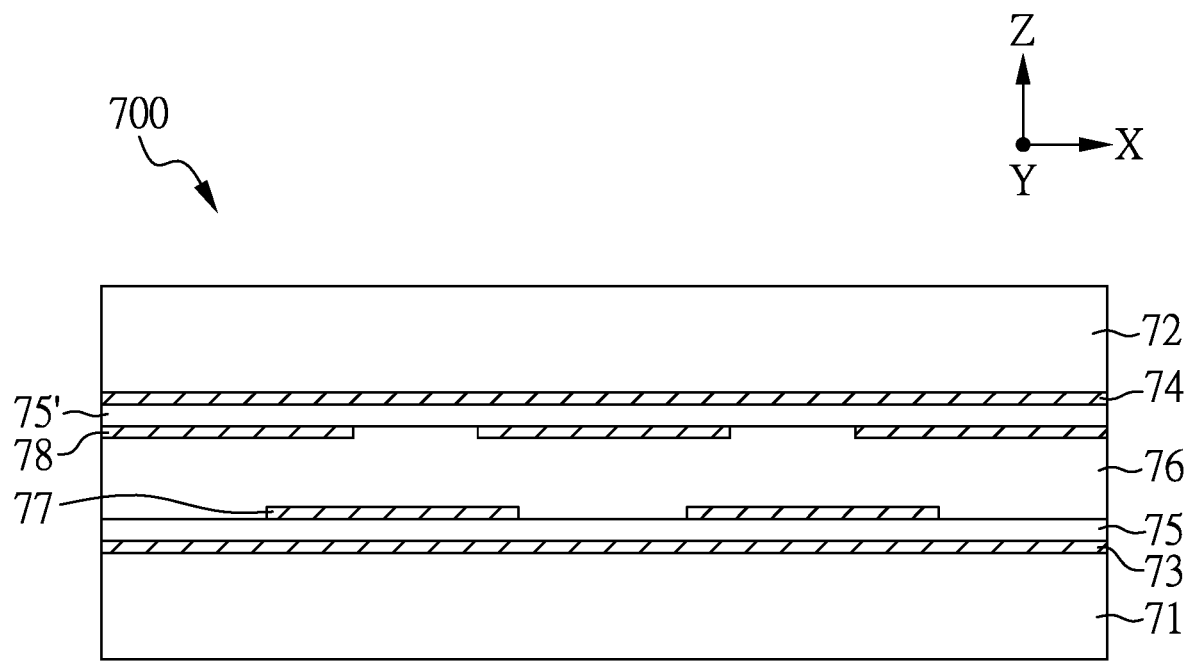
FIG. 8A to FIG. 8C are schematic views of second light modulation assemblies according to some embodiments of the present disclosure.
Figure 8B:
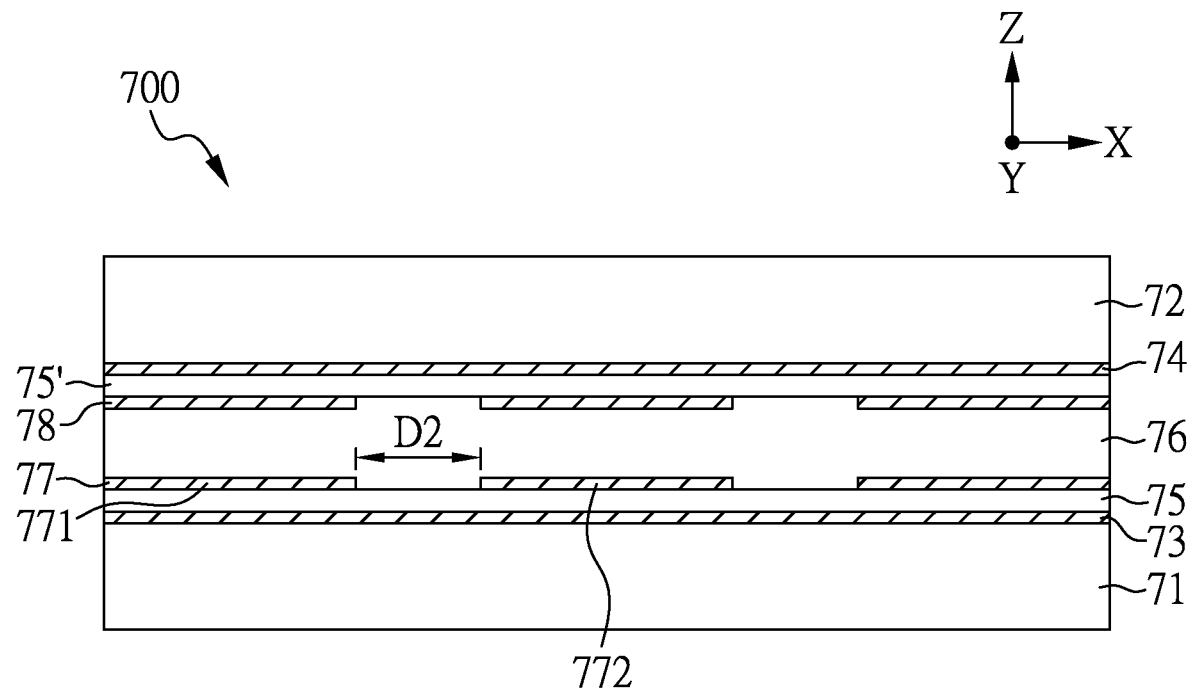
Figure 8C:
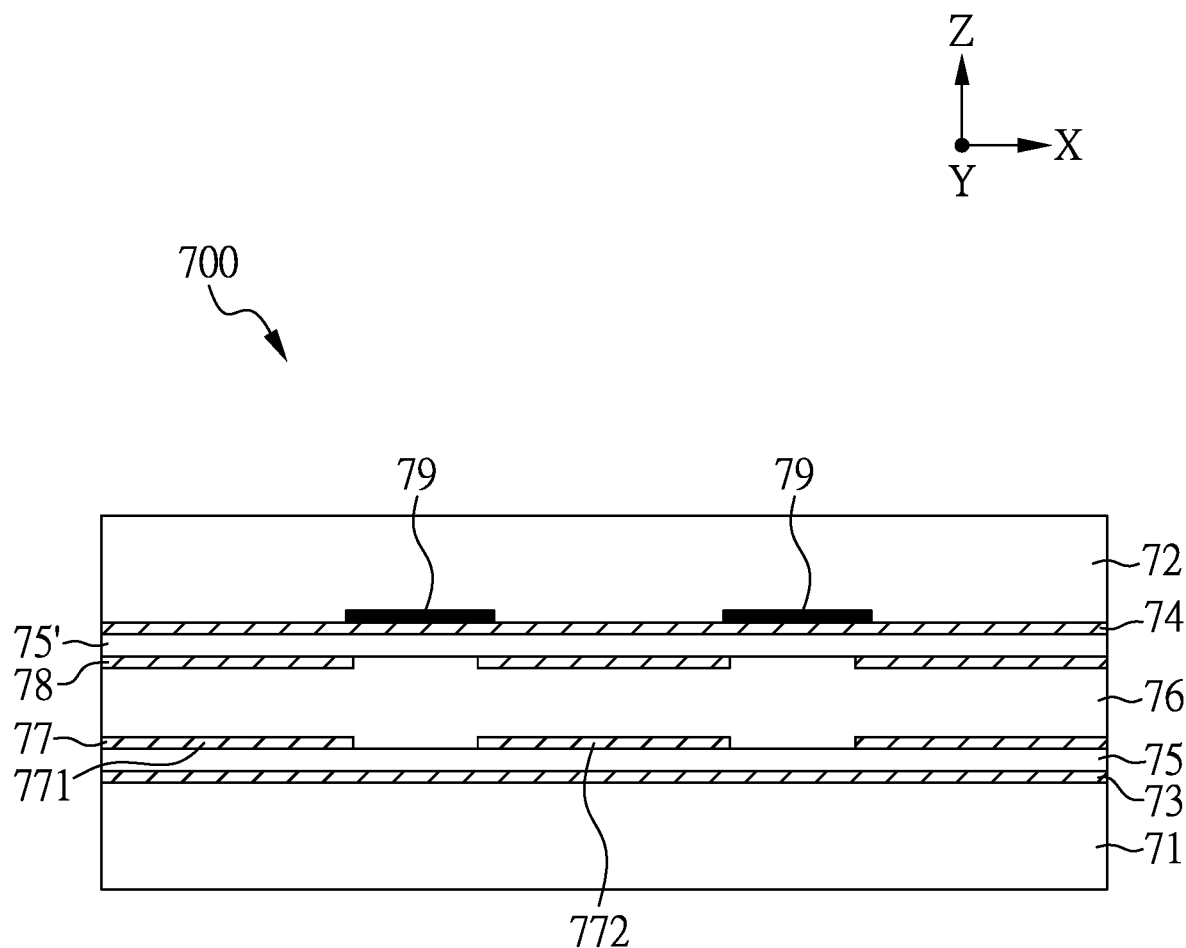

FIG. 8A to FIG. 8C are schematic views of second light modulation assemblies 700 according to some embodiments of the present disclosure. The second light modulation assembly 700 of the present disclosure may comprise: a third substrate 71; a fourth substrate 72 opposite to the third substrate 71; a third conductive layer 73 disposed on the third substrate 71; a fourth conductive layer 74 disposed on the fourth substrate 72; a third insulating layer 75 disposed on the third substrate 71; and a second light modulation layer 76 disposed between the third conductive layer 73 and the fourth conductive layer 74.

Herein, the materials of the third substrate 71 and the fourth substrate 72 are similar to that of the first substrate 11 or the second substrate 12. The materials of the third conductive layer 73 and the fourth conductive layer 74 are similar to that of the first conductive layer 13 or the second conductive layer 14. The material of the third insulating layer 75 is similar to that of the first insulating layer 15 or the second insulating layer 17. The second light modulation layer 76 is similar to the first light modulation layer 16. Thus, those materials are not described again.

When the second light modulation layer 76 comprises cholesteric texture liquid crystals, the electronic device of the present disclosure may be applied to a writing tablet or the like, but the present disclosure is not limited thereto. Taking the writing tablet as an example, the current writing tablet lacks the function of partial clearing, and its use is easily restricted. Thus, as shown in FIG. 8A to FIG. 8C, the second light modulation assembly 700 of the present disclosure may further comprise: a fifth conductive layer 77 disposed on the third substrate 71, wherein the third insulating layer 75 is disposed between the third conductive layer 73 and the fifth conductive layer 77; a sixth conductive layer 78 disposed on the fourth substrate 72; and a fourth insulating layer 75' disposed on the fourth substrate 72, wherein the fourth insulating layer 75' is disposed between the fourth conductive layer 74 and the sixth conductive layer 78.

When the voltage is applied to the third conductive layer 73 and the fourth conductive layer 74, the entire second light modulation layer 76 can be in a light-transmitting state, and the effect of clearing the entire screen of the writing tablet can be achieved. When the voltage is applied to the third conductive layer 73 and the sixth conductive layer 78 or to the fourth conductive layer 74 and the fifth conductive layer 77, the second light modulation layer 76 can be in a partial light-transmitting state, and the effect of partial clearing the screen of the writing tablet can be achieved.

The second light modulation assemblies 700 shown in FIG. 8A to FIG. 8C are substantially similar, except for the following differences. As shown in FIG. 8A, in one embodiment of the present disclosure, the fifth conductive layer 77 and the sixth conductive layer 78 are at least partially overlapped in a top view direction Z. As shown in FIG. 8B, in one embodiment of the present disclosure, the fifth conductive layer 77 and the sixth conductive layer 78 are substantially overlapped in the top view direction Z. During the partial clearing, the liquid crystals that are not overlapped with the fifth conductive layer 77 or the sixth conductive layer 78 in the top view direction Z are not easily controlled by the electric field, and the display effect may be affected. Thus, the fifth conductive layer 77 of the present disclosure may further comprise a first electrode 771 and a second electrode 772, and a distance D2 between the first electrode 771 and the second electrode 772 is less than or equal to 20 μm in a cross-sectional view; so the display effect can be improved. As shown in FIG. 8C, in one embodiment of the present disclosure, the fifth conductive layer 77 and the sixth conductive layer 78 are substantially overlapped in the top view direction Z. During the partial clearing, the liquid crystals that are not overlapped with the fifth conductive layer 77 or the sixth conductive layer 78 in the top view direction Z are not easily controlled, and the display effect may be affected. Thus, the second light modulation assembly 700 may further comprise a shielding layer 79 disposed on the fourth substrate 72, and the shielding layer 79 is at least partially overlapped with the fifth conductive layer 77 or the sixth conductive layer 78 in the top view direction Z. The shielding layer 79 may be used to shield the non-electric field area to improve the display effect. In the present disclosure, the shielding layer 79 may comprise black ink, resin, metal or a combination thereof; but the present disclosure is not limited thereto.

Figure 9:
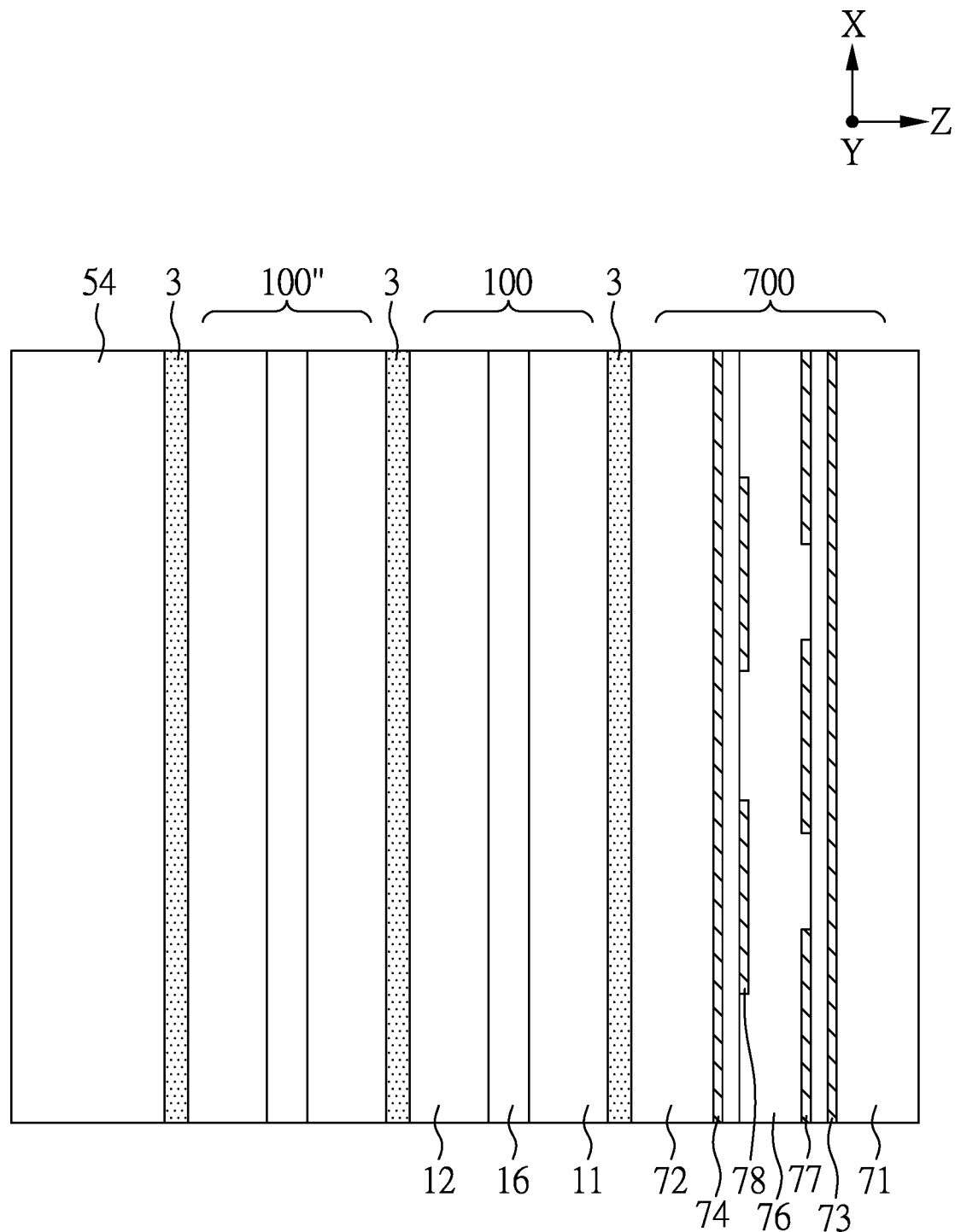
FIG. 9 is a schematic view of an electronic device according to some embodiments of the present disclosure.

FIG. 9 is a schematic view of an electronic device according to some embodiments of the present disclosure. As shown in FIG. 9, the electronic device of the present disclosure comprises: a first light modulation assembly 100; a second light modulation assembly 700 opposite to the first light modulation assembly 100; and a third light modulation assembly 100", wherein the first light modulation assembly 100 is disposed between the second light modulation assembly 700 and the third light modulation assembly 100".

The detail structures of the first light modulation assembly 100 and the third light modulation assembly 100" may be referred to those shown in FIG. 1A to 1C, and the detail structure of the second light modulation assembly 700 may be referred to those shown in FIG. 8A to FIG. 8C. Thus, the structures are not described again. The first light modulation assembly 100 and the second light modulation assembly 700 may be fixed by an adhesive layer 3; and the first light modulation assembly 100 and the third light modulation assembly 100" may be fixed by another adhesive layer 3. In addition, as shown in FIG. 9, the electronic device of the present disclosure may further comprise a support layer 54, wherein the third light modulation assembly 100" may be disposed between the first light modulation assembly 100 and the support layer 54. When the electronic device of FIG. 9 is applied to a smart window, the light transmittance of the second light modulation assembly 700 is low due to the random arrangement of the cholesteric texture liquid crystals, so the contract ratio of the electronic device may be increased. When the electronic device is applied to a writing tablet, the first light modulation assembly 100 and/or the third light modulation assembly 100" may be used as the black base plate of the writing tablet. However, the present disclosure is not limited thereto.

Figure 10A:
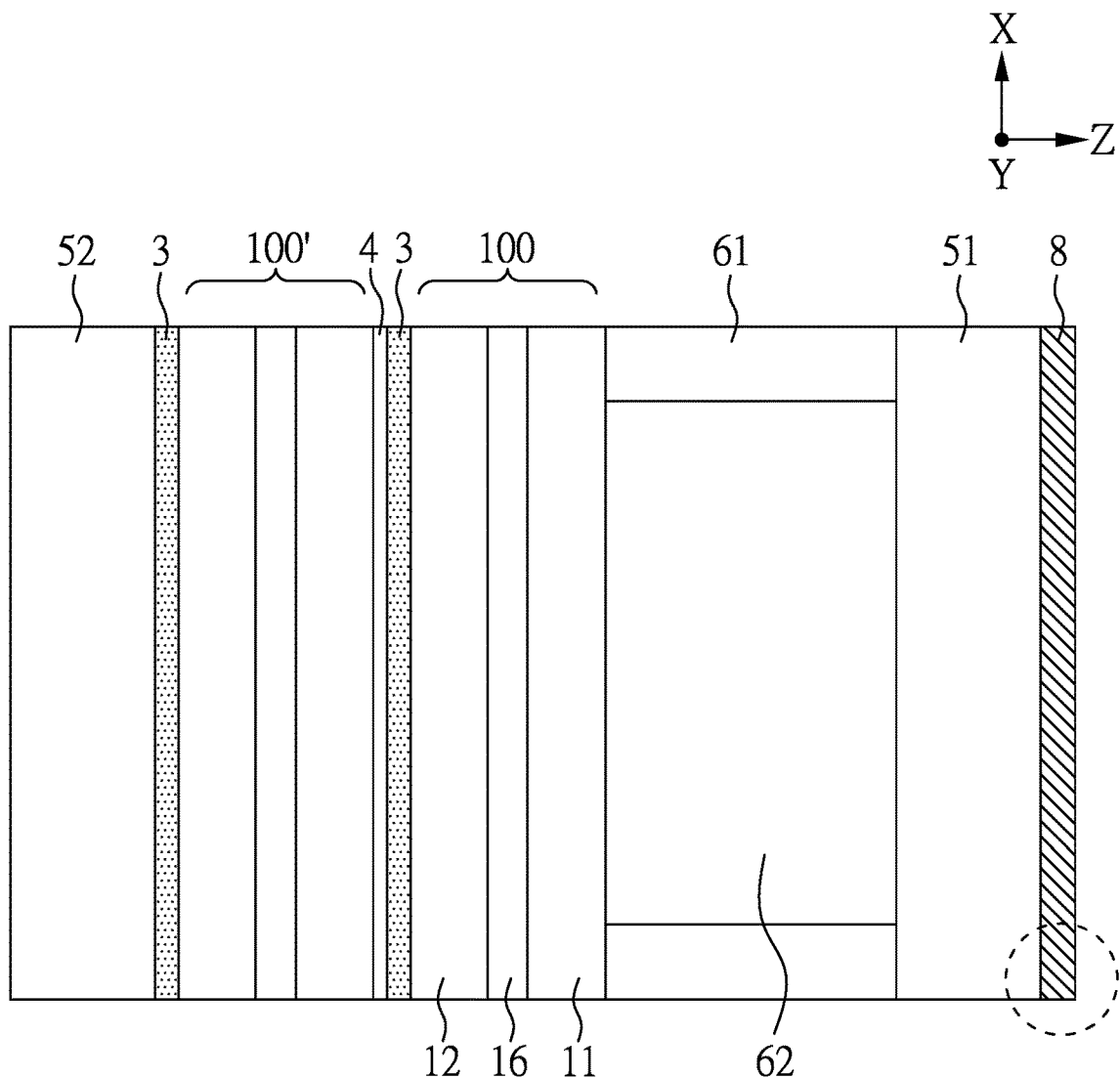
FIG. 10A is a schematic view of an electronic device according to some embodiments of the present disclosure.
Figure 10B:
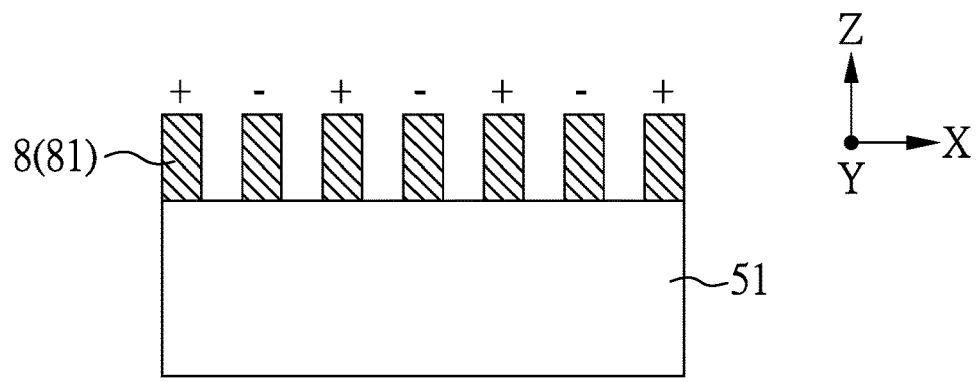
FIG. 10B is a partial enlarging view of FIG. 10A.

FIG. 10A is a schematic view of an electronic device according to some embodiments of the present disclosure, and FIG. 10B is a partial enlarging view of FIG. 10A. As shown in FIG. 10A, the electronic device of the present disclosure may further comprise a polarizer 4 opposite to the first light modulation assembly 100. More specifically, the polarizer 4 is disposed between the first light modulation assembly 100 and the second light modulation assembly 100', but the present disclosure is not limited thereto. In other embodiments of the present disclosure, for example, the polarizer 4 may be disposed adjacent to the first substrate 11 of the first light modulation assembly 100, or the polarizer 4 may be disposed between the second support layer 52 and the second light modulation assembly 100'. Thus, the contract ratio of the electronic device of the present disclosure may be increased, and the dark state effect of the electronic device may be improved.

In addition, as shown in FIG. 10A, the electronic device of the present disclosure may further comprise a metal layer 8 disposed on the first support layer 51. More specifically, the first support layer 51 is disposed between the first light modulation assembly 100 and the metal layer 8. The metal layer 8 may be used for heating or absorbing dust. As shown in FIG. 10B, the metal layer 8 may comprise patterned metal bumps 81. When voltage is applied to different metal bumps 81, an electric field can be formed between different metal bumps 81, and the purpose of dust absorption or the like can be achieved.

Figure 11A:
FIG. 11A and FIG. 11B are schematic views of first light modulation assemblies according to other embodiments of the present disclosure.
Figure 11B:
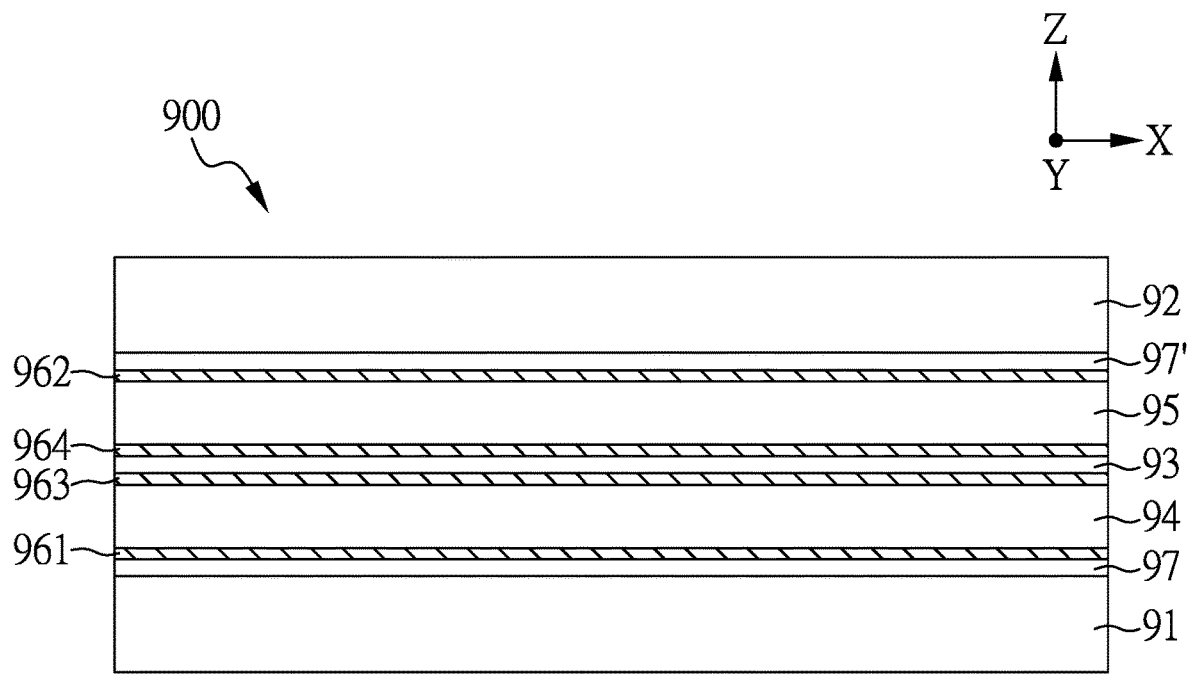

FIG. 11A and FIG. 11B are schematic views of first light modulation assemblies 900 according to other embodiments of the present disclosure. The first light modulation assembly 900 of the present disclosure comprises: a first substrate 91; a second substrate 92 opposite to the first substrate 91; a polarizer 93 disposed between the first substrate 91 and the second substrate 92; a first light modulation layer 94 disposed between the first substrate 91 and the polarizer 93; and a second light modulation layer 95 disposed between the second substrate 92 and the polarizer 93. By disposing the polarizer 93 between the first light modulation layer 94 and the second light modulation layer 95, the first light modulation assembly 900 may comprise plural light modulation layers, which can reduce the thickness or improve the dark state effect of the electronic device.

As shown in FIG. 11A, the first light modulation assembly 900 may further comprise: a first conductive layer 961 disposed on the first substrate 91; a second conductive layer 962 disposed on the second substrate 92; and a third conductive layer 963 disposed on the polarizer 93, wherein the first light modulation layer 94 is disposed between the first conductive layer 961 and the third conductive layer 963, and the second light modulation layer 95 is disposed between the second conductive layer 962 and the third conductive layer 963. Thus, the first light modulation layer 94 can be controlled by the first conductive layer 961 and the third conductive layer 963, and the second light modulation layer 95 can be controlled by the second conductive layer 962 and the third conductive layer 963. Therefore, the effect of light transmittance, heat insulation, shielding and/or privacy may be achieved.

The first light modulation assembly 900 shown in FIG. 11B is similar to that shown in FIG. 11A, except for the followings. As shown in FIG. 11B, the first light modulation assembly 900 may further comprise a fourth conductive layer 964 disposed on the polarizer 93, wherein the polarizer 93 is disposed between the third conductive layer 963 and the fourth conductive layer 964. Thus, the first light modulation layer 94 can be controlled by the first conductive layer 961 and the third conductive layer 963, and the second light modulation layer 95 can be controlled by the second conductive layer 962 and the fourth conductive layer 964. Therefore, the effect of light transmittance, heat insulation, shielding and/or privacy may be achieved.

As shown in FIG. 11A, in some embodiments of the present disclosure, the first light modulation assembly 900 may further comprise a first insulating layer 97 disposed on the first substrate 91, and the first conductive layer 961 is disposed between the first substrate 91 and the first insulating layer 97. Herein, the first insulating layer 97 may be used to improve the color halo phenomenon or protect the first conductive layer 961. Alternatively, as shown in FIG. 11B, the first insulating layer 97 may be disposed between the first substrate 91 and the first conductive layer 961 to improve the color halo phenomenon. In some embodiments of the present disclosure, the first light modulation assembly 900 may further comprise a second insulating layer (not shown in the figure) disposed on the first substrate 91, and the first conductive layer 961 is disposed between the first insulating layer 97 and the second insulating layer. Thus, the first insulating layer 97 or the second insulating layer can achieve the purpose of improving the color halo phenomenon or protecting the first conductive layer 961.

In some embodiments of the present disclosure, another first insulating layer 97' and/or another second insulating layer (not shown in the figure) may also be disposed on the second substrate 92 to further improve the color halo phenomenon or protecting the second conductive layer 962. In addition, even not shown in the figure, in some embodiments of the present disclosure, the first light modulation assembly 900 may further comprise an alignment layer disposed between the first light modulation layer 94 and the first insulating layer 97 and/or between the second light modulation layer 95 and another first insulating layer 97'. More specifically, the alignment layer may directly contact the first light modulation layer 94 and/or the second light modulation layer 95 to achieve the alignment effect.

Herein, the materials of the first substrate 91, the second substrate 92, the first conductive layer 961, the second conductive layer 962, the first insulating layer 97, the second insulating layer, another first insulating layer 97', another second insulating layer, the first light modulation layer 94 and the second light modulation layer 95 are similar to those described above, and are not described again. In addition, the materials of the third conductive layer 963 and the fourth conductive layer 964 are similar to that of the first conductive layer 961 or the second conductive layer 962 and are not described again.

Figure 12:
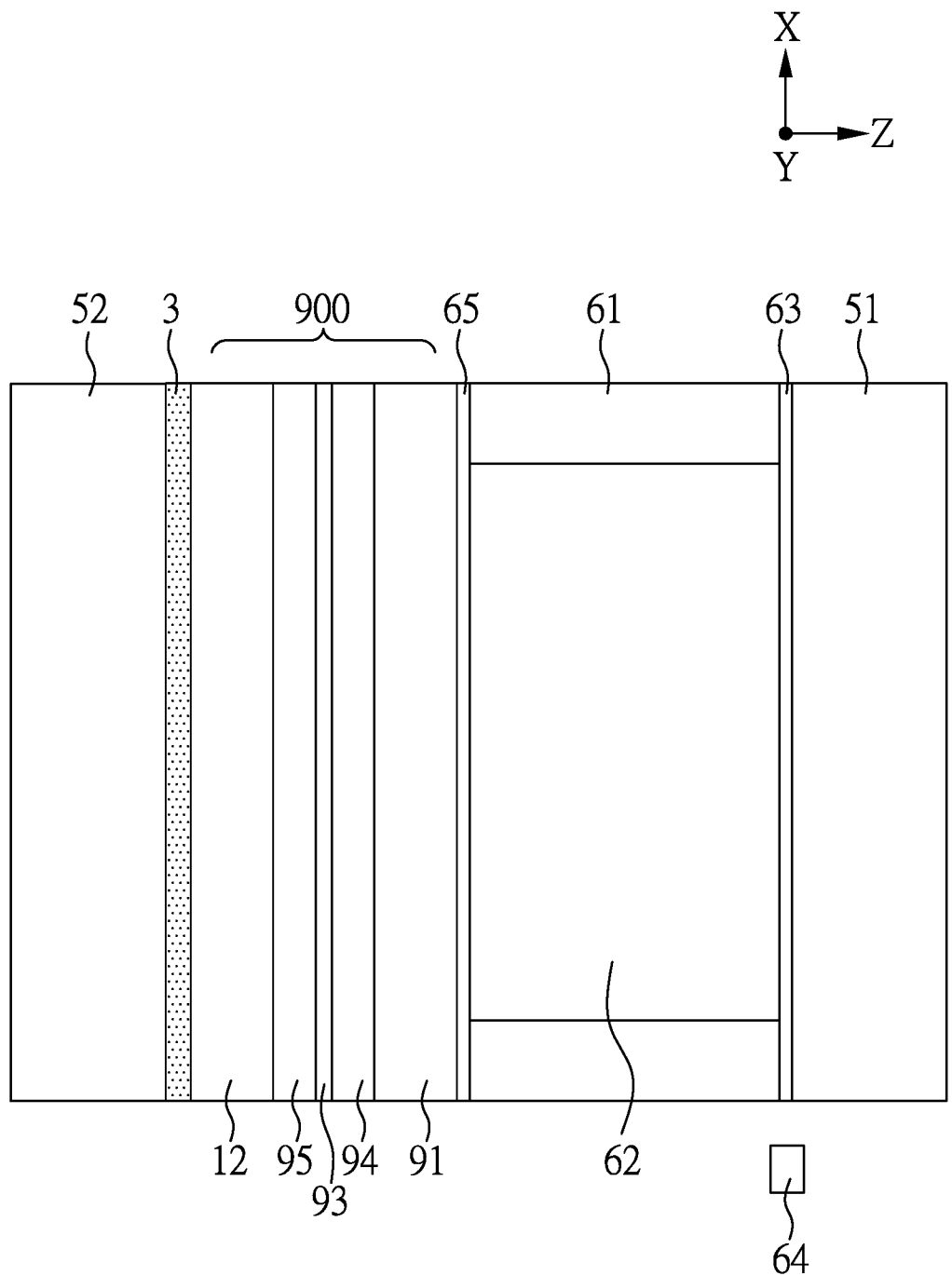
FIG. 12 is a schematic view of an electronic device according to other embodiments of the present disclosure.

FIG. 12 is a schematic view of an electronic device according to other embodiments of the present disclosure. The electronic device of FIG. 12 is similar to that of FIG. 5, except for the structure of the first light modulation assembly. In FIG. 12, the first light modulation assembly may be the first light modulation assembly 900 shown in FIG. 11A or FIG. 11B. In addition, for the convenience of description, parts of the structure of the first light modulation assembly 900, for example the first conductive layer 961, the second conductive layer 962, the third conductive layer 963 and the first insulating layer 97 are not shown in the FIG. 12.

As shown in FIG. 12, the electronic device of the present disclosure may further comprise a first support layer 51 and a second support layer 52, wherein the first light modulation assembly 900 is disposed between the first support layer 51 and the second support layer 52; a light guide plate 63 disposed on the first support layer 51; and a light source 64 disposed on a light incident surface of the light guide plate 63. Thus, the electronic device of the present disclosure may form a color panel, which may be applied to advertisement, decoration, etc.

In the present disclosure, the first light modulation assembly 900 shown in FIG. 11A or FIG. 11B may be used, and the first light modulation assembly 900 and the second support layer 52 may be fixed through an adhesive layer 3. In the present disclosure, the first light modulation assembly 900 and the first support layer 51 may be assembled through a sealing unit 61. In addition, the electronic device may further comprise an inert gas layer 62 disposed between the first light modulation assembly 900 and the first support layer 51. More specifically, the sealed space formed by the first light modulation assembly 900, the first support layer 51 and the sealing unit 61 may be filled with the inert gas to form the inert gas layer 62 to achieve the effect of constant temperature or soundproofing.

In some embodiments of the present disclosure, the electronic device may further comprise a reflective layer (not shown in the figure) disposed on the first support layer 51 and between the first support layer 51 and the light guide plate 63. In some embodiments of the present disclosure, the electronic device may further comprise an anti-reflection layer 65 disposed on the first light modulation assembly 900. More specifically, the anti-reflection layer 65 is disposed between the first substrate 91 of the first light modulation assembly 900 and the light guide plate 63.

Herein, the materials of the first support layer 51, the second support layer 52, the adhesive layer 3, the sealing unit 61, the reflective layer and the anti-reflection layer 65 are similar to those described above, and are not described again.

The above specific embodiments should be construed as merely illustrative, and not limiting the rest of the present disclosure in any way, and the features between different embodiments can be mixed and matched as long as they do not conflict with each other.

Although the present disclosure has been explained in relation to its embodiment, it is to be understood that many other possible modifications and variations can be made without departing from the spirit and scope of the disclosure as hereinafter claimed.

What is claimed is:

1. An electronic device, comprising:
a first light modulation assembly, comprising:
a first substrate;
a second substrate opposite to the first substrate;
a first conductive layer disposed on the first substrate;
a second conductive layer disposed on the second substrate;
a first insulating layer disposed on the first substrate; and
a first light modulation layer disposed between the first conductive layer and the second conductive layer; and
a second light modulation assembly opposite to the first light modulation assembly, wherein the second light modulation assembly comprises:
a third substrate;
a fourth substrate opposite to the third substrate;
a third conductive layer disposed on the third substrate;
a fourth conductive layer disposed on the fourth substrate;
a third insulating layer disposed on the third substrate; and
a second light modulation layer disposed between the third conductive layer and the fourth conductive layer;
a fifth conductive layer disposed on the third substrate, wherein the third insulating layer is disposed between the third conductive layer and the fifth conductive layer;
a sixth conductive layer disposed on the fourth substrate; and
a fourth insulating layer disposed on the fourth substrate, wherein the fourth insulating layer is disposed between the fourth conductive layer and the sixth conductive layer,
wherein the fifth conductive layer and the sixth conducive layer are at least partially overlapped in a top view direction.

2. The electronic device of claim 1, wherein the first conductive layer is disposed between the first substrate and the first insulating layer.

3. The electronic device of claim 1, wherein the first insulating layer is disposed between the first substrate and the first conductive layer.

4. The electronic device of claim 1, wherein the first light modulation assembly further comprises a second insulating layer disposed on the first substrate, and the first conductive layer is disposed between the first insulating layer and the second insulating layer.

5. The electronic device of claim 1, further comprising a polarizer opposite to the first light modulation assembly.

6. The electronic device of claim 1, further comprising:
a first support layer and a second support layer, wherein the first light modulation assembly is disposed between the first support layer and the second support layer;
a light guide plate disposed on the first support layer; and
a light source disposed on a light incident surface of the light guide plate.

7. The electronic device of claim 6, further comprising an anti-reflection layer disposed between the first substrate of the first light modulation assembly and the light guide plate.

8. The electronic device of claim 6, further comprising an inert gas layer disposed between the first light modulation assembly and the first support layer.

9. The electronic device of claim 1, further comprising an adhesive layer disposed between the first light modulation assembly and the second light modulation assembly.

10. The electronic device of claim 1, wherein the fifth conductive layer comprises a first electrode and a second electrode, and a distance between the first electrode and the second electrode is less than or equal to 20 µm in a cross-sectional view.

11. The electronic device of claim 1, further comprising a temperature adjusting assembly opposite to the first light modulation assembly, wherein the temperature adjusting assembly comprises two substrates and a vacuum layer, and the vacuum layer is disposed between the two substrates.

12. An electronic device, comprising:
a first light modulation assembly, comprising:
a first substrate;
a second substrate opposite to the first substrate;
a polarizer disposed between the first substrate and the second substrate;
a first light modulation layer disposed between the first substrate and the polarizer;
a second light modulation layer disposed between the second substrate and the polarizer;
a first conductive layer disposed on the first substrate;
a second conductive layer disposed on the second substrate; and
a third conductive layer disposed on the polarizer,
wherein the first light modulation layer is disposed between the first conductive layer and the third conductive layer, and the second light modulation layer is disposed between the second conductive layer and the third conductive layer,
wherein the first light modulation layer is controlled by the first conductive layer and the third conductive layer, and the second light modulation layer is controlled by the second conductive layer and the third conductive layer.

13. The electronic device of claim 12, wherein the first light modulation assembly further comprises a first insulating layer disposed on the first substrate, and the first conductive layer is disposed between the first substrate and the first insulating layer.

14. The electronic device of claim 12, wherein the first light modulation assembly further comprises a first insulating layer disposed on the first substrate, and the first insulating layer is disposed between the first substrate and the first conductive layer.

15. The electronic device of claim 12, further comprising:
a first support layer and a second support layer, wherein the first light modulation assembly is disposed between the first support layer and the second support layer;
a light guide plate disposed on the first support layer; and
a light source disposed on a light incident surface of the light guide plate.

16. The electronic device of claim 15, further comprising an anti-reflection layer disposed between the first substrate of the first light modulation assembly and the light guide plate.

17. The electronic device of claim 15, further comprising an adhesive layer disposed between the first light modulation assembly and the second support layer.

* * * * *